Figure 1:
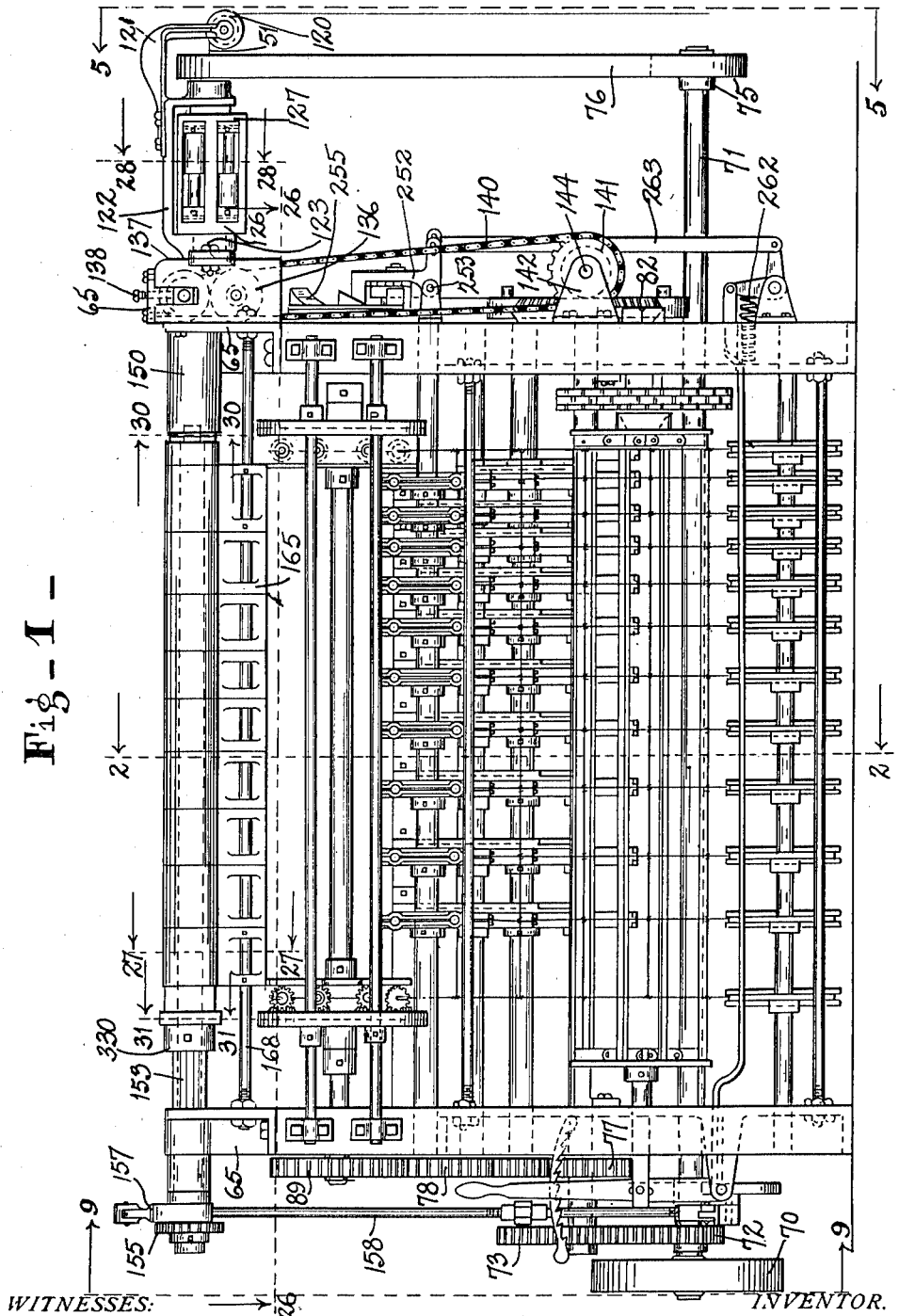

G. W. WHITTINGTON.
WIRE FENCE MACHINE.
APPLICATION FILED OCT. 14, 1911.

1,066,561.

Patented July 8, 1913.
11 SHEETS—SHEET 1.

WITNESSES:
E. Ad. Mayo.
O. M. McLaughlin

INVENTOR.
George W. Whittington.
BY
V. H. Lockwood
ATTORNEY.

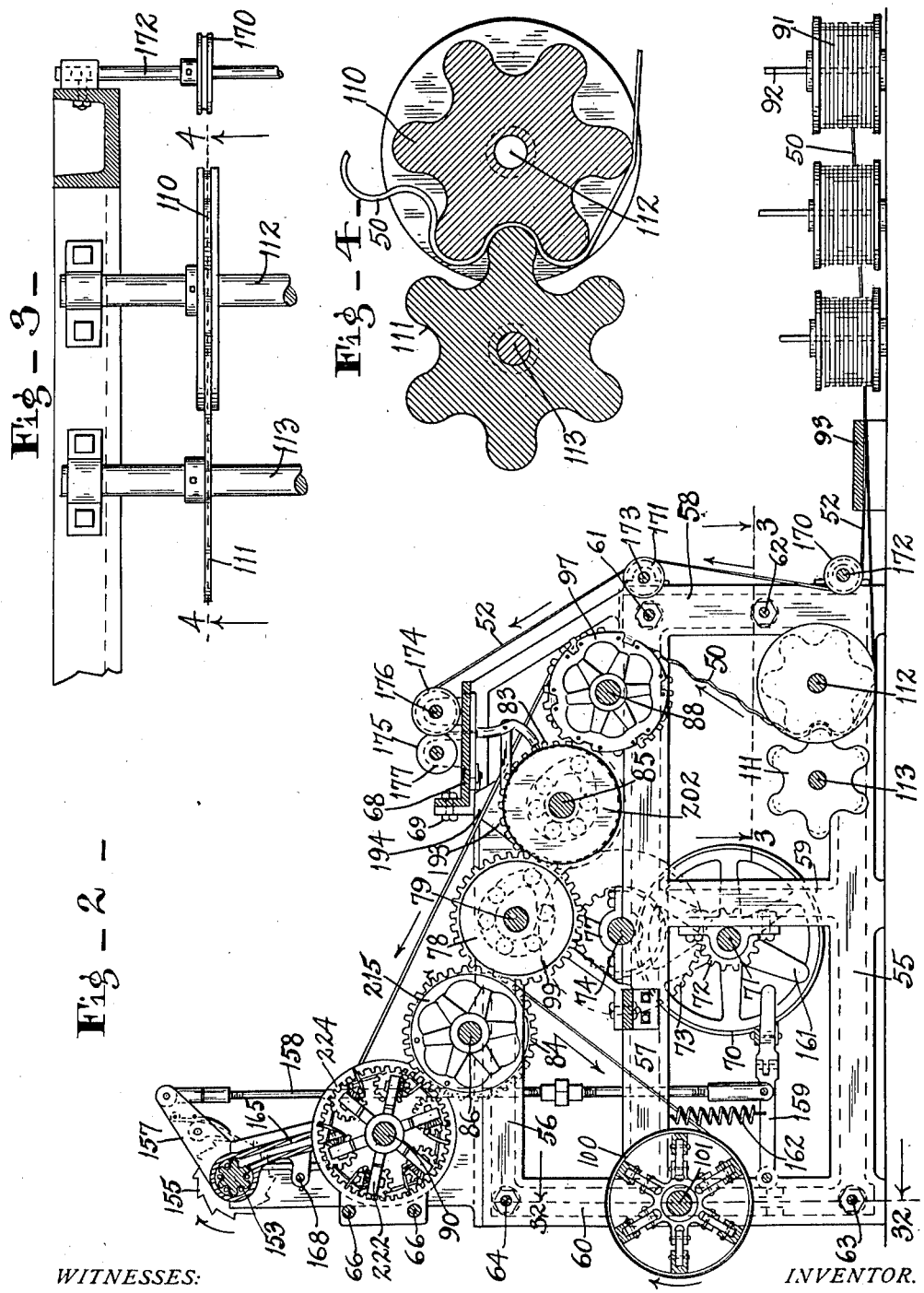

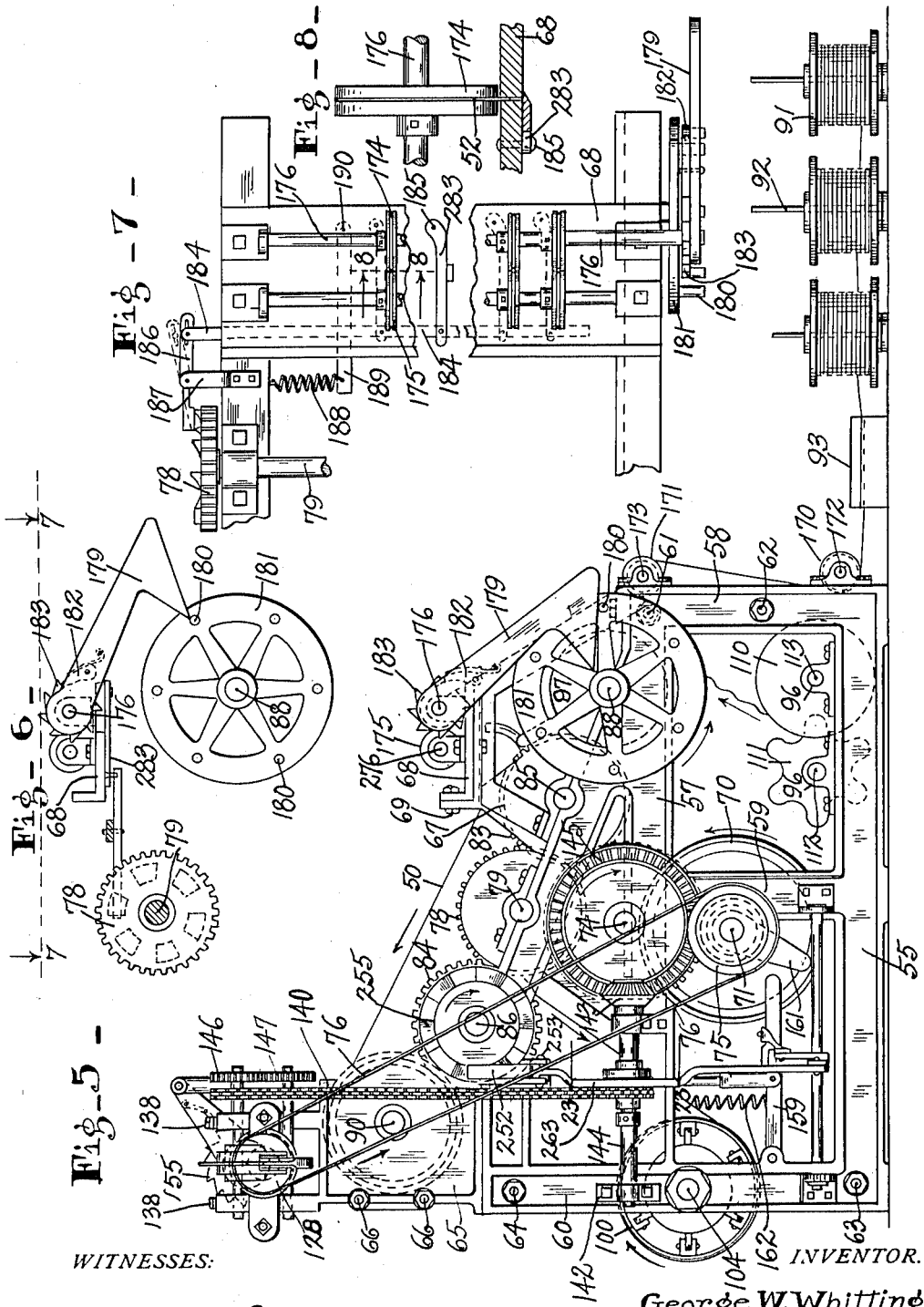

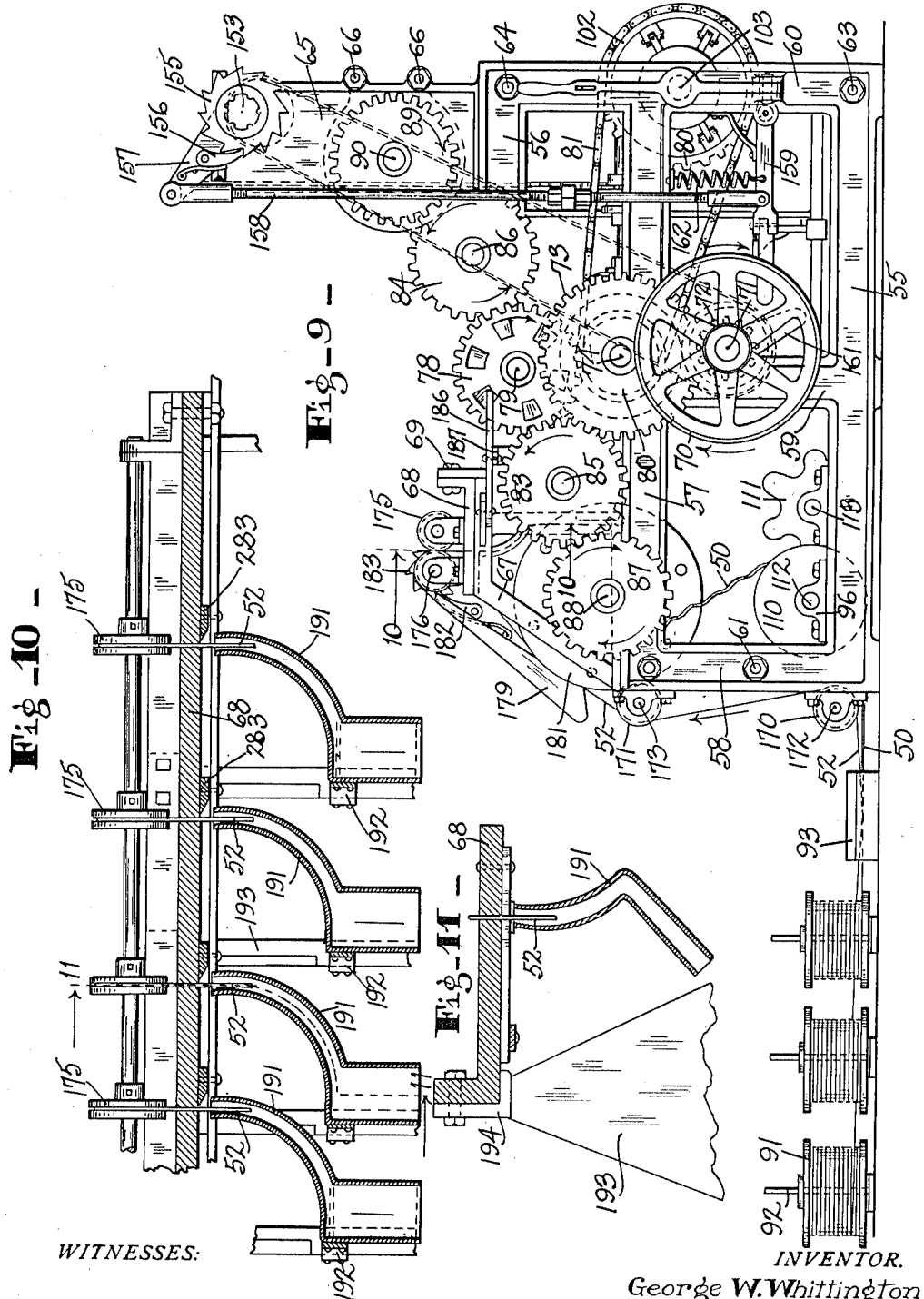

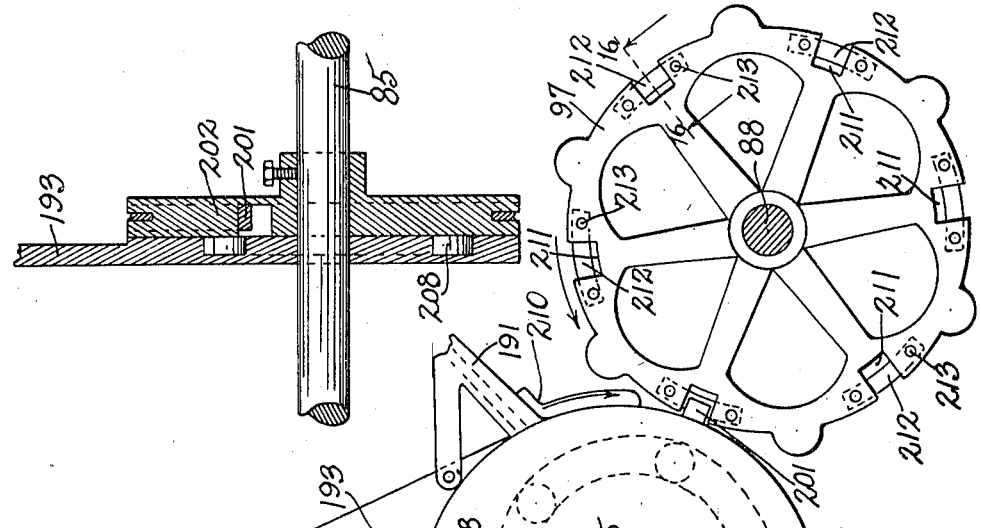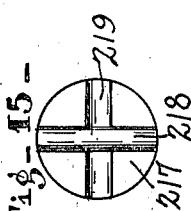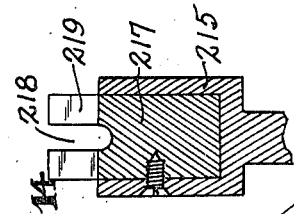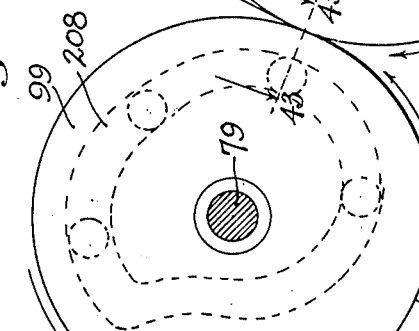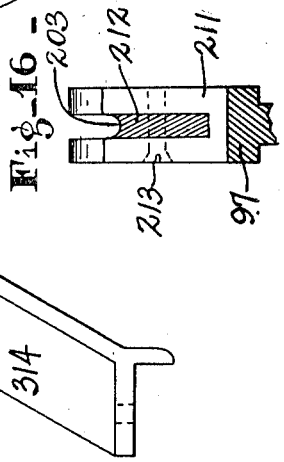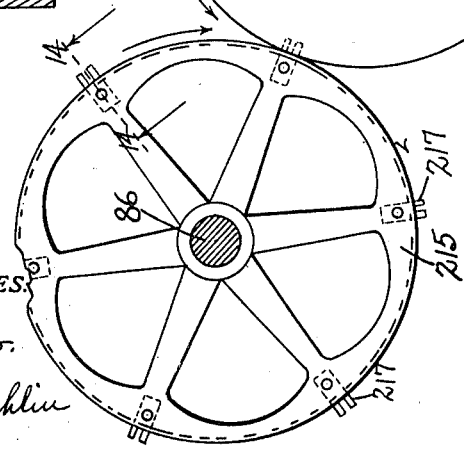

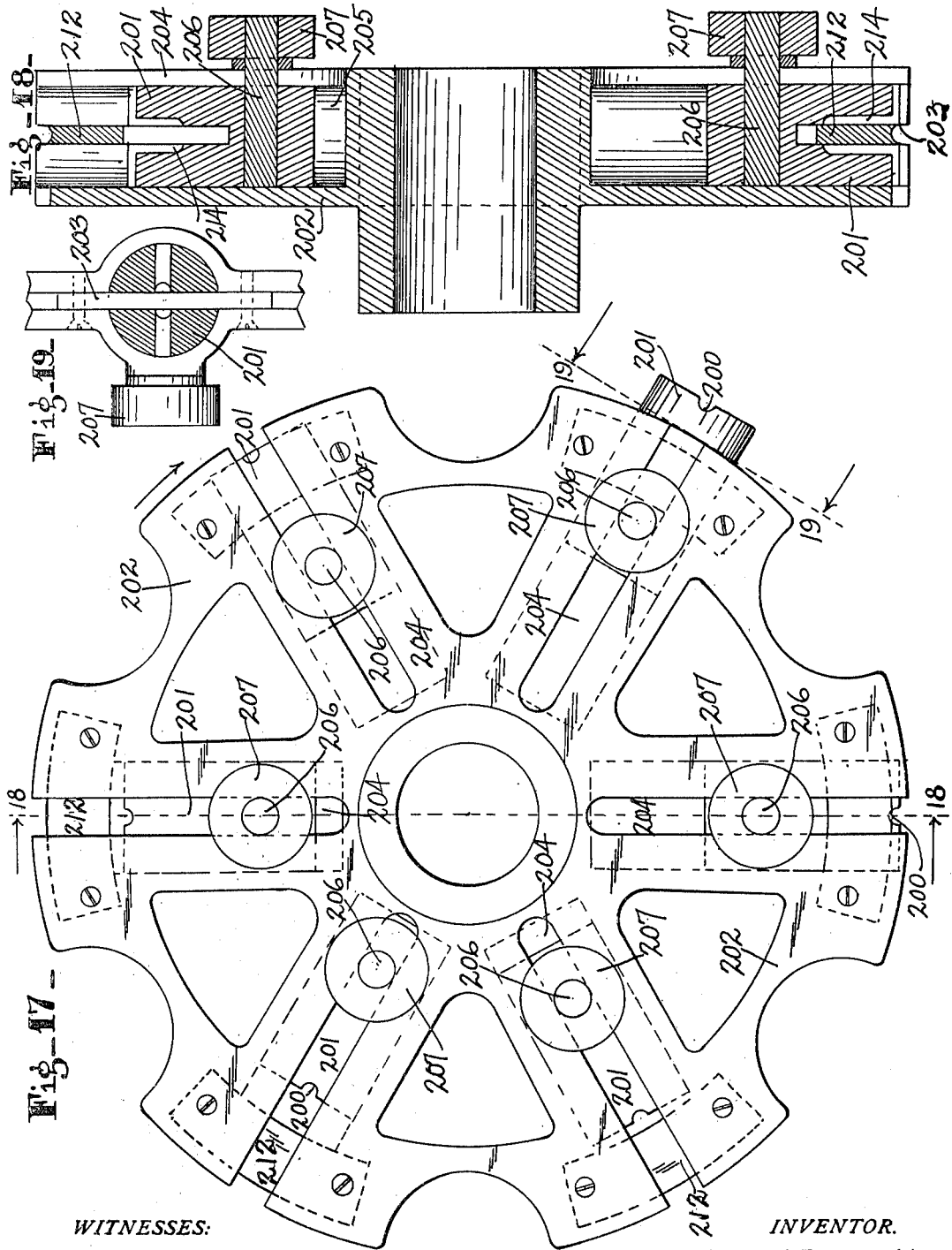

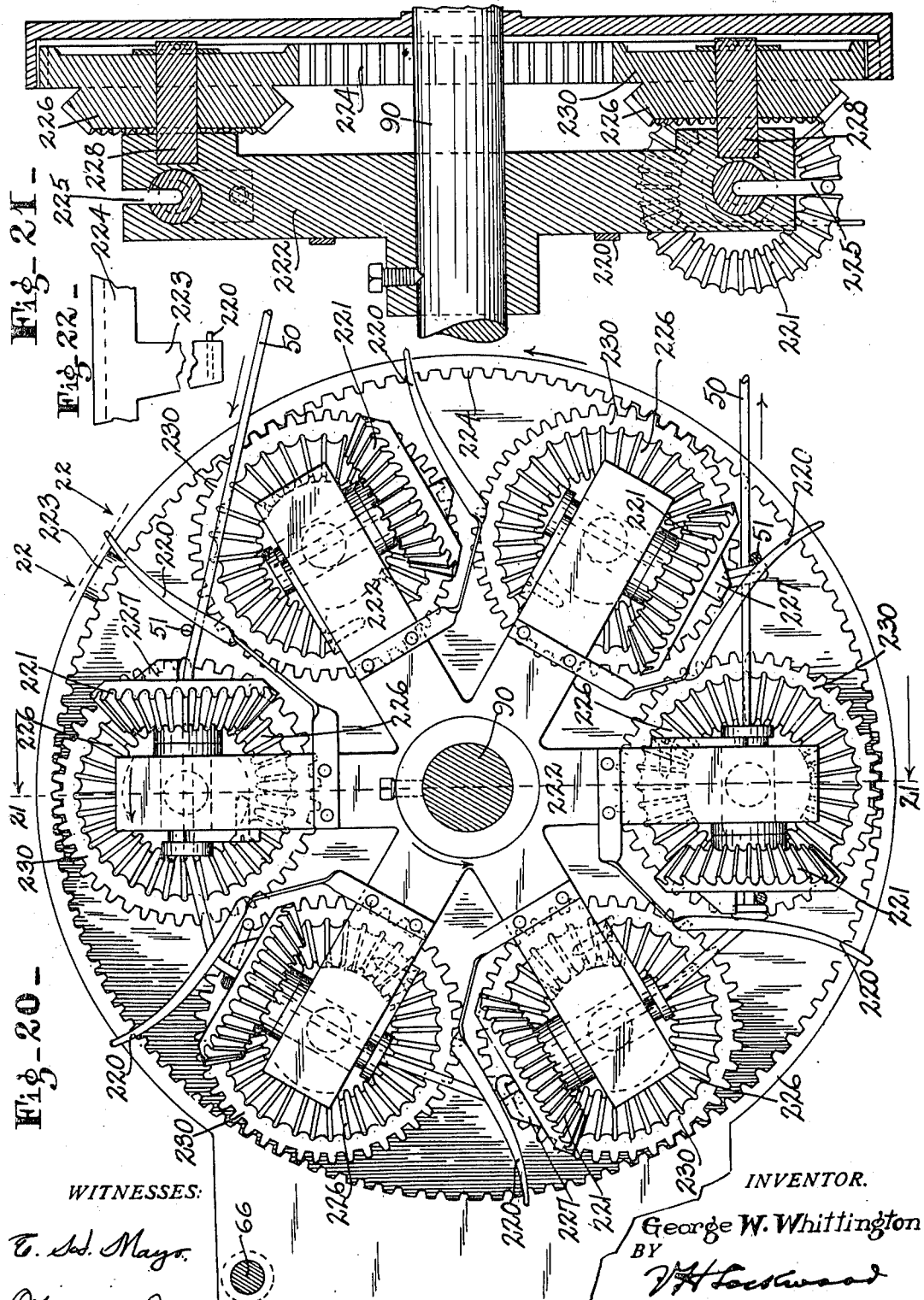

G. W. WHITTINGTON.
WIRE FENCE MACHINE.
APPLICATION FILED OCT. 14, 1911.
1,066,561.
Patented July 8, 1913.
11 SHEETS—SHEET 8.
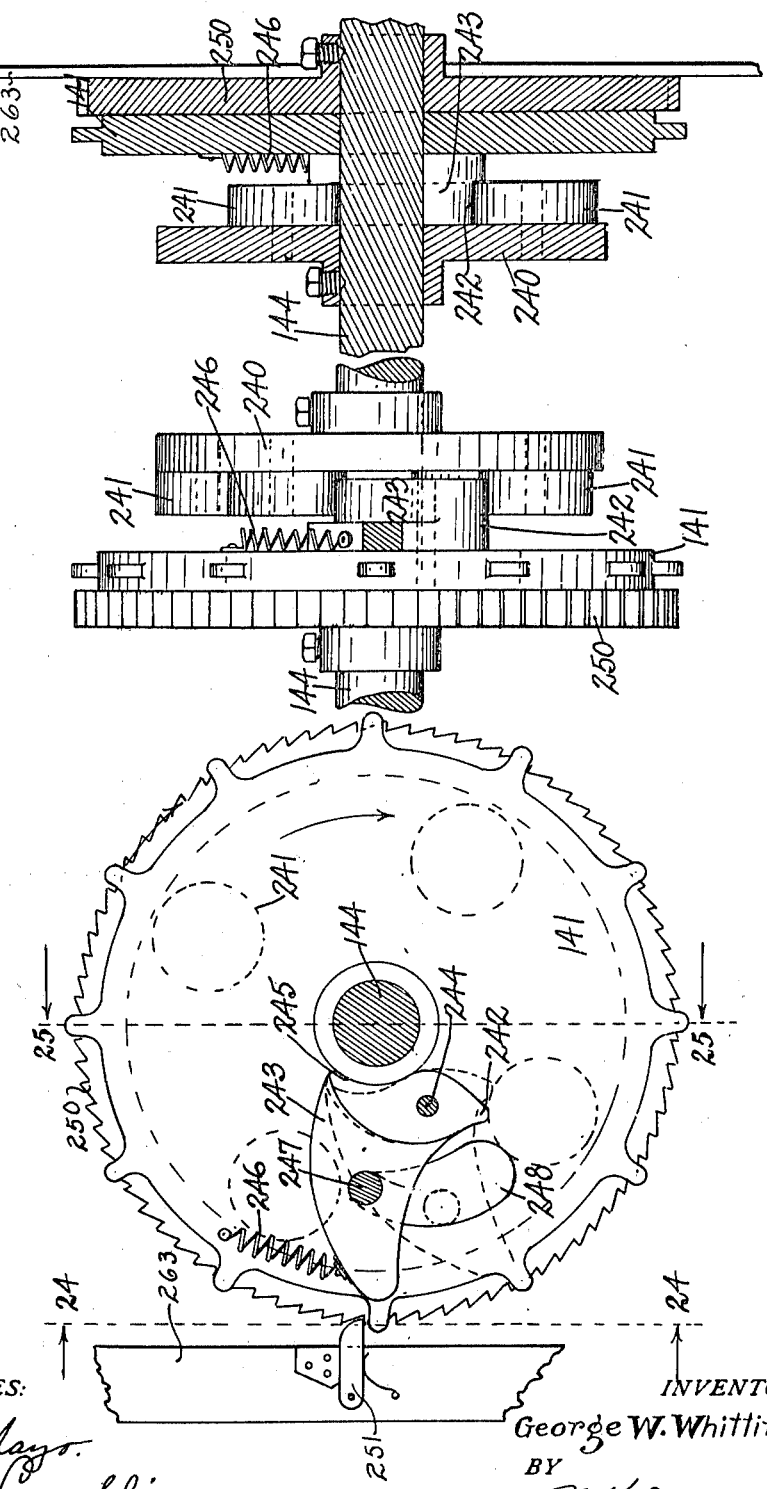

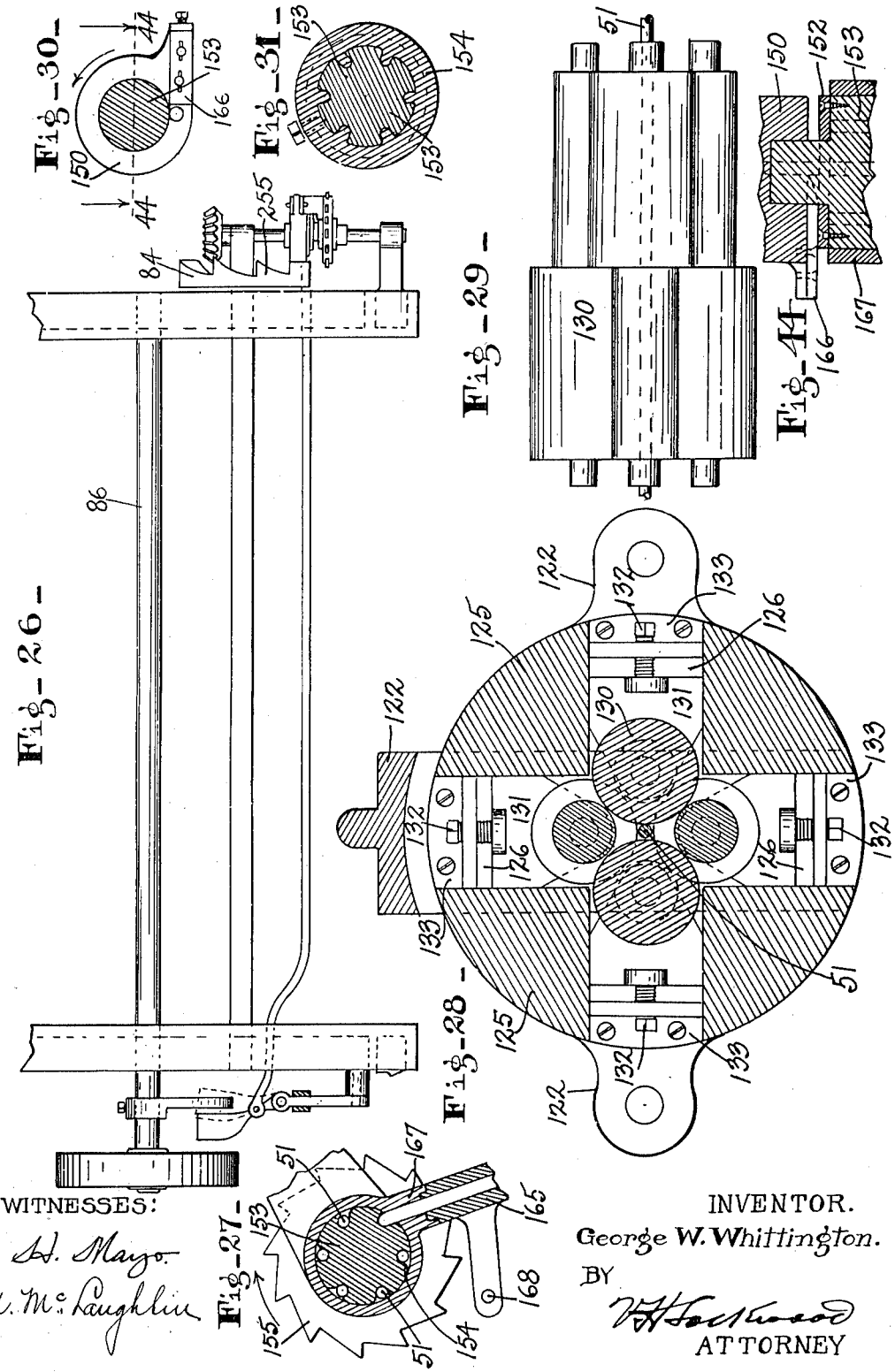

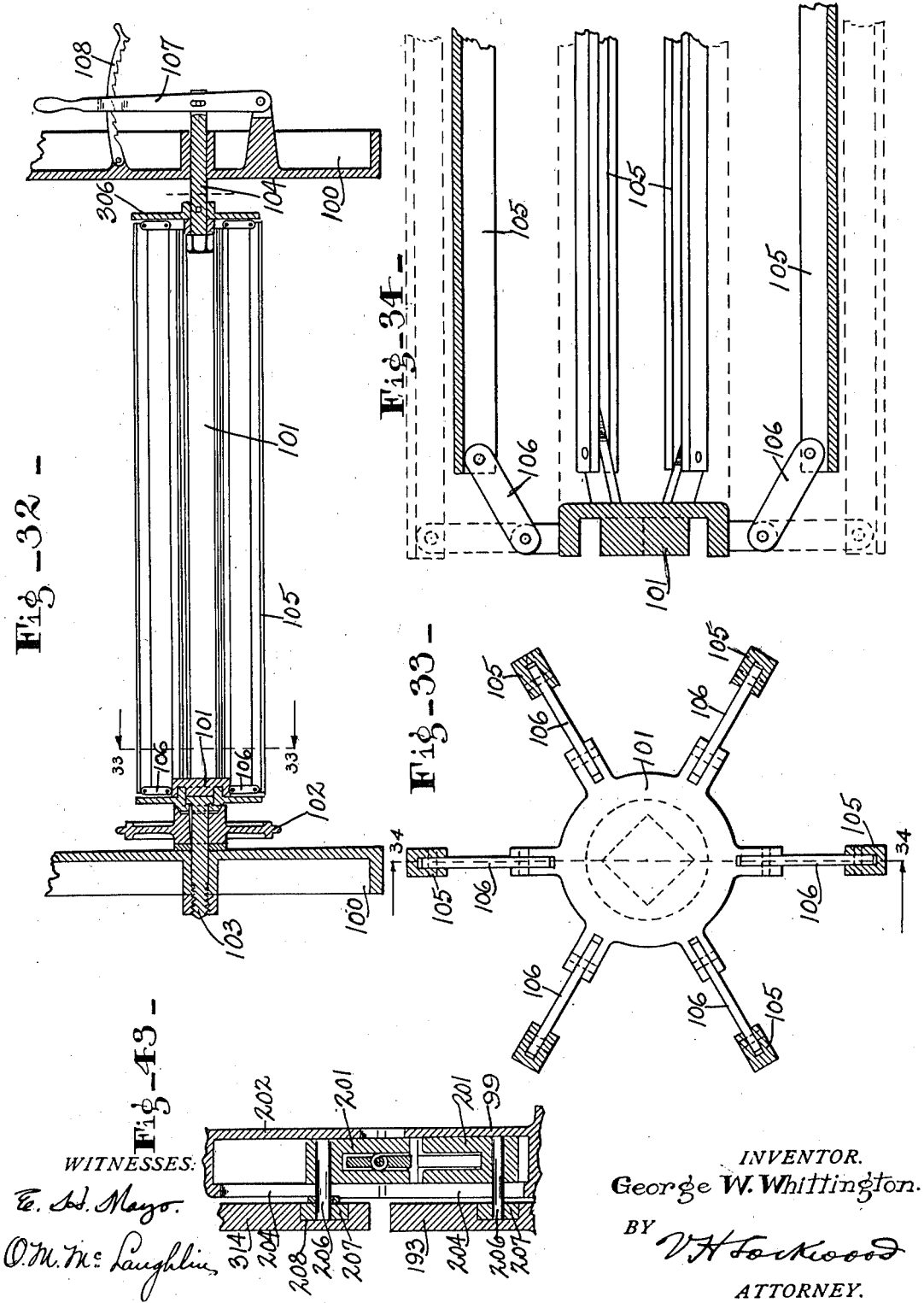

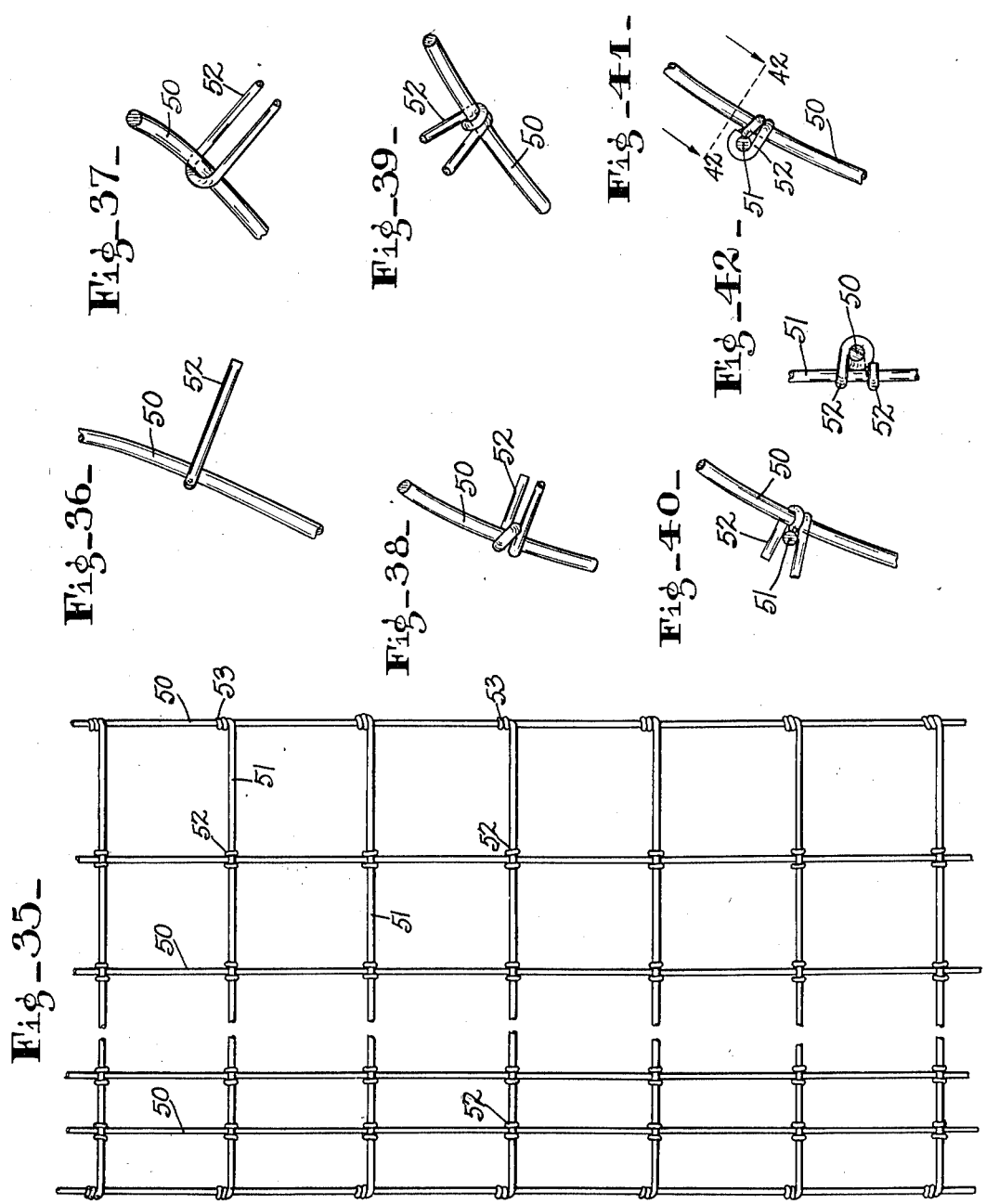

UNITED STATES PATENT OFFICE.

GEORGE W. WHITTINGTON, OF INDIANAPOLIS, INDIANA, ASSIGNOR, BY DIRECT AND MESNE ASSIGNMENTS, TO THE INDIANA MACHINE AND WIRE COMPANY, OF INDIANAPOLIS, INDIANA.

WIRE-FENCE MACHINE.

1,066,561.     Specification of Letters Patent.     Patented July 8, 1913.

Application filed October 14, 1911. Serial No. 654,784.

*To all whom it may concern:*

Be it known that I, GEORGE W. WHITTINGTON, a citizen of the United States, and a resident of Indianapolis, county of Marion, and State of Indiana, have invented a certain useful Wire-Fence Machine; and I do hereby declare that the following is a full, clear, and exact description thereof, reference being had to the accompanying drawings.

The object of this invention is to provide a machine which will automatically construct wire fencing of the type herein shown and described, wherein the strand wires are united and held in place by cross wires which are coiled about the marginal strand wires and are secured to the intermediate strand wires by a separate tie wire for each intersection, which is looped about the intersecting wires by the machine.

One feature of the invention consists in the arrangement of the machine in such manner that the construction of the fencing is continuous and the strand wires are not checked in their progress through the machine for the purpose of having the cross wires and tie wires secured in place, but these are secured in connection with the strand wires, while the latter, or the fencing, is feeding through the machine and without any stop whatever. The fencing or fabric not only travels all the time through the machine, but always travels through it at the same speed while it is being formed, there being no reduction in the speed while the ties are being made. This enables the machine to construct the fencing very rapidly and increase the capacity of the machine and decrease the cost of the construction of the fencing or fabric.

The nature of the invention will be understood from the accompanying drawings and the following description and claims.

*Drawings.*—In the drawings, Figure 1 is a rear elevation of the fence making machine. Fig. 2 is a section on the line 2—2 of Fig. 1. Fig. 3 is a section on the line 3—3 of Fig. 2. Fig. 4 is a section on the line 4—4 of Fig. 3 showing the means for crimping the strand wires. Fig. 5 is a side elevation of the right-hand side of the machine on the line 5—5 of Fig. 1. Fig. 6 is a fragmentary view of the upper right-hand corner of the machine as seen in Fig. 5, showing the tie-wire feed mechanism in its actuated position. Fig. 7 is a plan view of what is shown in Fig. 6, parts being broken away. Fig. 8 is a section on the line 8—8 of Fig. 7. Fig. 9 is a side elevation of the left-hand side of the machine on the line 9—9 of Fig. 1. Fig. 10 is a section on the line 10—10 of Fig. 9 showing a detail of the means for diverting the tie-wire from a vertical to a horizontal position across the twister wheel. Fig. 11 is a section on the line 11—11 of Fig. 10. Fig. 12 is a sectional view of the tie-wire twister mechanism as shown in Fig. 2, but on a larger scale and parts being omitted. Fig. 13 is a section on the line 13—13 of Fig. 12 showing a detail of the cam plate. Fig. 14 is a section on the line 14—14 of Fig. 12. Fig. 15 is a plan view of the twister head shown in Fig. 14. Fig. 16 is a section on the line 16—16 of Fig. 12 showing the bridge for sustaining the strand wire during the first action of applying the tie-wire. Fig. 17 is a side elevation of the twister wheels showing the means for mounting the cam wheels for operating the twister heads. Fig. 18 is a section on the line 18—18 of Fig. 17. Fig. 19 is a section on the line 19—19 of Fig. 17. Fig. 20 is an enlarged view of the outside cross wire twister mechanism as shown in Fig. 2. Fig. 21 is a section on the line 21—21 of Fig. 20, parts being omitted for the sake of clearness. Fig. 22 is a plan view of the trip mechanism for catching the cross wires under the twister wheel on the line 22—22 of Fig. 20, said trip being partly broken away. Fig. 23 is a section on the line 23—23 of Fig. 5 showing the mechanism of the intermittent clutch-stop, the dotted line position showing the clutch disengaged. Fig. 24 is a section on the line 24—24 of Fig. 23. Fig. 25 is a section on the line 25—25 of Fig. 23. Fig. 26 is a detail of the trip mechanism for actuating the cross wire feed mechanism as seen on the line 26—26 of Fig. 1. Fig. 27 is a section on the line 27—27 of Fig. 1, parts being omitted and parts broken away to show the revolving cross-wire feed mechanism. Fig. 28 is a section on the line 28—28 of Fig. 1 showing the means for straightening the cross wires. Fig. 29 is a side elevation of the roller mechanism shown in cross section in Fig. 28. Fig. 30 is a section on the line 30—30 of Fig. 1 showing the cut-off knife for severing the cross wires. Fig. 31 is a section on the line 31—31 of Fig. 1 showing the adjustable stop for limiting the endwise movement of the cross wires. Fig. 32 is a section on the line 32—32 of Fig. 2 showing the collapsible reel mechanism. Fig. 33 is a section on the line 33—33 of Fig. 32. Fig. 34 is a section on the line 34—34 of Fig. 33, the extended position being shown by dotted lines. Fig. 35 is a portion of the fence, centrally broken away. Fig. 36 is a side elevation of a strand wire with the tie-wire bent to its first position. Fig. 37 is a perspective view of Fig. 36. Fig. 38 is a side elevation of a strand wire with the tie-wire bent to its second position. Fig. 39 is a perspective view of Fig. 38 in the position it assumes when the cross wire is first dropped into the open fork. Fig. 40 is a side elevation of a strand wire with a cross wire in the fork of the tie-wire. Fig. 41 is a side elevation of a strand wire with the fork of the tie-wire bent over the cross wire into the final position. Fig. 42 is a section on the line 42—42 of Fig. 41, showing the fork of the tie-wire bent in opposite directions around the cross wire. Fig. 43 is a section on the line 43—43 of Fig. 12. Fig. 44 is a section on the line 44—44 of Fig. 30.

*The nature of the fence fabric.*—The kind of wire fabric or fencing which the machine is intended to make is illustrated in Figs. 35 to 42 of the drawings. It consists of longitudinal or strand wires 50, the number thereof being immaterial, and cross wires 51 extending entirely across the fabric and secured at their ends to the marginal strand wires, and individual tie wires 52 for uniting the intersections of the strand and cross wires which are located between the marginal wires. The strand wires may be straight but are preferably kinked somewhat, as is well known, for the purpose of permitting the fence fabric to adjust itself under changes of temperature. The cross wires are straight, overlapping the intermediate wires, and at each end wrapped twice about the marginal wire, as is shown at 53, although the number of wraps of the cross wire around the strand wire is immaterial. In the foregoing part of the fence fabric there is no peculiar novelty. The tie wires 52 for uniting the intermediate intersections of the strand and cross wires are illustrated in Figs. 36 to 42 and each consists of a short piece of wire which is first placed about a strand wire in the form of a simple staple-like loop, see Figs. 36 and 37. Then both ends of this tie wire 52 are coiled once about the strand wire, as shown in Figs. 38 and 39, which shortens the free ends of the tie wire. While in this condition the cross wire 51 is dropped or placed in position between the free ends of the tie wire 52, see Fig. 40. Then the free ends of that wire are turned, as shown in Figs. 41 and 42. This effectually secures the strand and cross wires together and so as not to be readily dislocated.

*General structure of the machine.*—Turning now to the machine for making the above described style of fence fabric, the machine will be considered with reference to the following general division thereof into parts; namely, the frame, the driving mechanism, the mechanism for feeding the strand wires, the means for cutting and feeding the cross wires into place, the means for securing the ends of the cross wires to the marginal strand wires, the means for feeding and cutting the short tie wires, and finally, the means for securing the intermediate strand and cross wires by the short tie wires.

The frame consists, generally speaking, of oppositely located side frames connected by cross rods. On each side there is a main feed frame having a bottom longitudinal bar 55, an upper longitudinal bar 56, an intermediate longitudinal bar 57 the latter being parallel with the bar 55, a front vertical bar 58 and an intermediate bar 59 connecting the bars 55 and 57, and a rear bar 60 connecting the bars 55, 56 and 57. All these bars 55 to 60 are integral with each other, and are connected and held in position by cross rods 61 and 62 at the front part of the machine, and 63 and 64 at the rear part of the machine. There are some transverse shafts mounted in said frame, which also tend to hold the sides of the frame in position. Upon the rear part of the frame just described there is an upper frame consisting of side plates 65 held in position by two cross rods 66. There is also a forward upper frame for carrying the feed and knife mechanism for controlling the tie wires, and it consists of side members 67 and a top cross plate 68 secured to the end frame member 67 by bolts 69.

*Driving mechanism.*—Power from any suitable source is applied to the driving pulley 70, see Fig. 1, which is mounted on the driving shaft which extends entirely through the machine transversely and has bearings, not shown, which are secured to the rear surfaces of the upright frame bars 59. The driving shaft 71 has a small gear 72 on it which is shown by dotted lines in Figs. 5 and 9 and which meshes and drives the large gear 73 on the transverse shaft 74, which is mounted upon the horizontal frame bars 57 and which extends entirely through the machine. On said shaft 71 there is also at the other end from the driving pulley a pulley 75 carrying a belt 76, which drives the cross wire straightening mechanism. On the shaft 74 there is a gear 77 which meshes with the gear 78 on the shaft 79, which extends transversely through the machine and is mounted upon the upper frame bars 56. Near the other end of the shaft 74 there is a sprocket wheel 80 for driving the sprocket chain 81, which drives the wheel 102. There is also a bevel gear 82 at the extreme end of the shaft 74, which drives the cross wire feed mechanism. The gear 78 on the shaft 79 meshes with two gears 83 and 84 on the shafts 85 and 86, respectively, said shafts extending transversely of the machine and being also mounted on the frame bars 56. The gear 83 meshes with and drives a gear 87 on the shaft 88, which is mounted upon the frame bars 57. The gear 84 meshes with and drives the gear 89 on the shaft 90.

*Strand wire feeding mechanism.*—Each strand wire is fed through the machine from an individual reel 91, which in Fig. 9 is shown on the floor in front of the machine on vertical rods 92. The wires pass under a bridge 93 to individual pulleys 111 and 110 mounted loosely on transverse rods 113 and 112 mounted in the bearings 96 on the lower frame bars 55. Thence the strand wires pass upwardly over individual sheave wheels 97, see Fig. 2, which are secured on the shaft 88, where the tie wires 52 are first applied. Thence the strand wires pass under the individual wheels 202 on the shaft 85, and thence under the individual wheels 99, which are mounted on the shaft 79, and thence to the fabric reel 100, the spindles 103 and 104 of which are mounted in the upright frame bars 60 at the rear of the machine. The strand wires and finished wire fabric are really drawn through the machine by this reel 100, which is driven by the sprocket chain 81 engaging the sprocket wheel 102 on the reel. The reel construction constitutes no necessary part of this invention, as it has been previously patented to me Oct. 4, 1904, No. 771,405. As shown in Figs. 32, 33 and 34, the reel consists of the central shaft portion 101 with end spindles 103 and 104. The sprocket wheel 102 is on the spindle 103, and there are longitudinal bars 105 held in place by links 106 pivoted on their ends, and also pivoted to the head of the inner shaft portion 101, so that said bars can collapse by being moved to the right-hand, as shown in Fig. 34. The fabric is wound over the series of bars 105 when they are in their outer position, and they are held in that outer position by the disk 306 on the spindle 104 which is moved longitudinally by the lever 107, and said lever is held in place by the rack 108. When the lever 107 is moved to the left to the position shown in Fig. 32, the disk 306 throws all of the bars 105 to the left from the full-line position shown in Fig. 34 to the full-line position shown in Fig. 32. After the coil of wire has been finished the lever 107 is thrown to the right and the spindle 104 disengaged, which permits the reel to drop down or be moved with the coil of fabric thereon, and then the outer bars 105 of the reel will readily collapse so that the reel can be drawn out of the coil of fabric. Then the reel is replaced. The longitudinal wires are crimped to enable the wire fabric to stretch under the influence of changes of temperature by their passing between individual crimping wheels 110 and 111 secured on shafts 112 and 113, respectively, which are mounted on the lower frame bars 55, see Figs. 2, 3, 4, 5 and 9.

*Mechanism for feeding and cutting the cross wires.*—From a bundle of wire lying on the floor or elsewhere, the wire for the cross wires is fed over the pulley 120, see Fig. 1, which is carried by the arm 121 secured to a wire straightening frame 122, which is bolted to the top rear frame 65, see Figs. 1 and 9. From the wheel 120 the wire enters the transversely disposed wire straightener, which appears in Figs. 1 and 28. The frame 122 consists of an upper horizontal portion and two downwardly extending ends and, as seen in Fig. 1, the inner one of said ends is provided with ears through which the bolts 123 secure said frame to the frame 65. In the two ends of said frame 122 the straightener shown in Fig. 28 is rotatably mounted. It consists of four longitudinal sector-like bars 125 spaced apart and secured at their ends to end plates or heads 126 and 127, see Fig. 1, said heads 126 and 127 and the bars 125 being integral and the latter head 127 having a shaft, not shown, on which the pulley 128, see Fig. 5, is secured, over which pulley the belt 76 runs, and whereby the straightening device is revolved. In the spaces between the bars 125, see Figs. 28 and 29, coöperating straightening rolls 130 engage the wires 51. Each of these rolls varies in thickness, as shown, a thick portion of one roller registering with a thin portion of another roller. Thus in Fig. 28 the two laterally located rollers have their thickened portions acting on the wire 51 at a point where the wire is out of contact with the upper and lower rollers, but, as shown in Fig. 28, beyond the thickened portions of the two lateral rollers the thickened portions of the upper and lower rollers are engaging the wire. In Fig. 29 each roller is shown to have a thick and a thin portion. The number of thick and thin portions may be multiplied, but the effect of this is to straighten the wire much more quickly and easily than if the rollers were straight continuous cylinders. While the wire is passing through this straightener the rollers are being rapidly revolved and the spindles of the rollers are mounted in bearing plates 131, see Fig. 28, which are adjusted in position by the screws 132 in the end plates in the angle iron 133. This enables the rollers to be adjusted with relation to each other.

Referring now to Fig. 1, the wire 51 passes from the straightener at the upper right-hand corner of the machine between the two feed rolls 135 and 136, which are mounted in the plate or box 137, which is secured to the side of the frame 65. In the top of this box there are two set screws 138 for forcing the upper feed roll down to get the desired tension. The upper feed roll is driven by a sprocket wheel driven by a chain 140 running down from the sprocket wheel 141, see Fig. 1, mounted in the bracket 142 secured to the main frame and driven by a bevel gear 143 on the shaft 144 of the sprocket wheel 141. The bevel gear 143 appears in Fig. 5 and is driven by the large bevel gear 145 on the shaft 74. As seen in the upper left-hand corner of Fig. 5, power is transmitted from the upper feed roll to the lower one by the spur gears 146 and 147 on the spindles of said feed rolls, respectively. From the feed wheels 135 and 136 just described the wire 51 passes through an opening in the cutting disk 152, which is secured to the shaft 153, and thence through one of the grooves 154 in the periphery of the shaft 153 which extend longitudinally of that shaft in the surface thereof, as shown in Fig. 27. One end of said shaft 153 is mounted in the end of the casting 150 and the other end in the frame 65, and it is actuated step by step by the ratchet 155, see Fig. 9, on said shaft and a spring pawl 156 on the arm 157 loosely pivoted on said shaft and actuated by the rod 158 which extends down to the lever 159 which is fulcrumed at one end in the frame 60, and the other end is actuated by the arm 161 which extends from and is secured to the shaft 71, see Fig. 2. Said lever 159 is returned after being actuated to its normal position by the spring 162, and it is formed of two parts hinged together so that the inner end may be moved laterally into the path of the arm 161 so as to be actuated thereby. The length of the rod 158 is adjustable so as to pre-determine the extent of throw of the ratchet arm 157. In the machine here shown, such movement amounts to sixty degrees, as there are six equidistant grooves 154 in the shaft 153, see Fig. 27. Hence each actuation of said shaft by the arm 157 brings one of the grooves 154 to a position as shown in Fig. 27, for discharging the cross wire 51 into the guide 165. After the wire has been fed the desired length into a groove on the shaft 153 the shaft revolves one step, and such movement of the shaft will carry the wire around with it and cause it to be severed from the main bundle of wire 51 by the knife 166, which is adjustably secured to the frame 150 adjacent the disk 152 on the end of the shaft 153, see Fig. 30. This severing arises from the fact that the wire extends through a slot in the disk 152 and when the wire is moved by the shaft 153, the knife severs it. As the cross wires 51 have been cut or severed they are discharged, as shown in Fig. 27, downwardly into the guides 165. The initial guides 167 extend downwardly from each of the parts 330 and 150 and are in alinement with the guides 165 which are secured to the rod 168, which is connected at each end with the frame 65. The parts 165 are vertically slotted with the slots of two guides opening toward each other, and, therefore, they guide merely the ends of the cross wires 51 down to the strand wires as they pass around the wheel to the tie or twisting mechanism, where the same is united with the strand wires, see Fig. 20.

While the cross wire is being severed by the cutting revolution of the disk or rotary cutter 152 for moving the wire against the stationary cutter or knife 166, it is necessary to stop the feeding of the cross wire from the bundle and this would be for one-sixth of a revolution of the slotted shaft 153. The mechanism for controlling this is shown in Figs. 23, 24 and 25, and also in Figs. 1 and 5. The sprocket wheel 141 is loosely mounted on the shaft 144, which is driven by the gears 143 and 145, see Fig. 5, and is driven from said shaft by the disk 240 secured on said shaft, see Fig. 25. This disk carries four rollers 241 on its side adjacent to the sprocket wheel but spaced somewhat therefrom and in position to engage at each revolution of the disk 240 the end 242 of the trip 243 which is fulcrumed to the side of the sprocket wheel 141 by the pin 244, see Fig. 23, and has a bearing surface at 245 resting upon a hub of the sprocket wheel, and its outer end projects radially toward the periphery of the sprocket wheel, and near its outer end a spring 246 is connected with it at one end and at the other end said spring is secured to the face of the sprocket wheel so that the spring tends to hold the trip 243 in such position that the bearing surface 245 will rest on the hub and the point 242 will project into the path of the roller 241, and then the sprocket wheel will be caused to revolve by the engagement between said trip 243 and the roller 241 on the disk 240 in the direction indicated by the arrow in Fig. 23, excepting when the trip 243 is moved into the dotted line position shown in Fig. 23, and then the point 242 will not be engaged by any of the rollers 241. This movement of the trip 243 is effected by a pin 247 which projects into the trip 243 through the slot 248 in the sprocket wheel from the ratchet wheel 250 which is loosely mounted on the shaft 144. The ratchet wheel 250 is actuated for the purpose of causing this disengaging movement of the trip by a pawl 251 on the rod 263, which is actuated by a rock lever 252 on the rod 253, see Fig. 5, the upper end of said lever 253 engaging and being actuated by lugs 255 on the side of the wheel 84, see Fig. 5. These lugs are spaced apart so as to correspond with the grooves in the shaft 153 which carries the cross wires, and the upper end of the lever 252 is held in engagement with the side of the wheel 84 by springs 162 and 262. Hence the machine through the mechanism described, including the wheel 84, automatically and periodically stops the feeding of the wire for making the cross wires while each cross wire is being severed.

*Means for securing the ends of the cross wires to the marginal strand wires.*—The cross wire 51 is deposited upon the strand wires 50 as seen in Fig. 20, at the righthand side of a vertical radial line through the wheel there shown between a spring arm 220 and one of the twister wheels 221. These parts are mounted on the arms of a spider 222, which is secured on the shaft 90, which is driven by the wheel 89, see Fig. 9, and said spring arm 220 projects out far enough to engage a lug 223 on the lateral edge of a stationary internal gear 224, which is secured to two of the rods 66 on the frame, see Fig. 5. As the spider 222 revolves in the direction indicated by the arrow in Fig. 20, the spring arm 220 will engage the lug 223, and when it escapes from said lug will strike the cross wire sharply and throw it against the face of the twister 221 between the lug 227 thereon and the strand wire 50 which lies in the radial slot 225 of the twister wheel 221 coaxial with said twister wheel. At that time the extreme ends of the cross wires will be slightly overlapping the two marginal strand wires, and hence rotary movement of the twister 221 and lug 227 will necessarily coil the extreme ends of the cross wire around the strand wires. The twister 221 is driven by the bevel gear 226 mounted on an arbor 228 extending from an arm of the spider 222 and so as to mesh with the twister. Associated with the bevel gear 226 there is a spur gear 230 which meshes with the internal stationary gear 224, as shown in Fig. 21. As the spider and sets of gears rotate, as shown in Fig. 20, the twister wheel will be given enough revolutions to wrap the cross wire one or more times around the strand wire. Hence only the marginal strand wires go around the mechanism shown in Fig. 20, and these together with the cross wires attached to them, leave the bottom of the wheel therein shown, moving forwardly to the wheel 215 on the shaft 86, and pass over that wheel and down between wheel 215 and wheel 99, where the intermediate strand wires are secured to the cross wires, and thence the completed fabric passes down to the reel. The marginal strand wires pass to the twisting mechanism, which has just been described, from the wheel 97 without touching the intermediate wheels 202, 99 and 215, as seen in Fig. 2.

*Means for feeding and cutting the short tie wires.*—The wire from which the short tie wires are cut is marked 52' at the forward portion of the machine, as shown in Fig. 2. There is one of these wires 52 for each intermediate strand wire and each of these wires comes from a bundle on the floor and passes under its corresponding pulley 170 and over the pulley 171 mounted respectively on rods 172 and 173, which are mounted on the front part of the main frame. Thence the wire 52 passes to the wheels 174 and 175, the former of which is secured on the shaft 176 and the latter on the shaft 276 mounted in boxes 177, said shaft and boxes being mounted on the plate 68. The boxes 177 are adjustable on said plate so as to predetermine the pressure of the wheel 175 against the wheel 174 to cause the wire 52 to be fed. The shaft 176 is driven by means shown in Figs. 5 and 6. As is shown, an arm 179 is loosely mounted on the shaft 176 and is oscillated by having its lower end provided with a beveled head which rides upon pins 180 in the wheel 181 on the shaft 88. The numbers of these pins and their location correspond with the dies for forming and tying the tie wires around the strand wires. As the wheel 181 revolves it successively throws out the lower end of the arm 179, and a spring pawl 182 on said arm engages the ratchet wheel 183 secured on the shaft 176 and operates it step by step. The wire 52 is fed down through a hole in the plate 68 a certain distance according to the throw of the arm 179, as shown in Fig. 6, and it is there cut off by the knife 283, there being one knife for each wire 52 and all of the knives being operated by the bar 184, see Figs. 7 and 8. The bar 184 extends entirely across the machine and is pivoted to the free ends of all the knives 283 and said knives are pivoted at 185 to the underside of the plate 168. The bar 184 is reciprocated by the lever 186 which is fulcrumed between its ends to the bar 187 secured to the side of the frame, see Fig. 7. One end of said lever 186 is loosely pivoted to the outer end of the bar 184, and the other end is engaged and actuated by teeth on the side of the wheel 78, see Figs. 6 and 9. The knives and bar 184 are all returned by the spring 188, which is connected at one end to the side frame of the machine and at the other end to the bar 189 which is pivoted to the underside of the frame 68 at 190 and between its ends is pivoted to or engages the bar 184 so as to move it.

*Means for securing the strand and cross wires by the tie wires.*—The cut-off tie wires 52 are intended to be about one inch and a half long and as they are severed they drop into chutes 191, see Figs. 10 and 11. These chutes extend downwardly with an upwardly curved portion and a lower straight portion which are secured with brackets 192, which are connected to vertical plates 193 extending down from a cross bar 194 which extends through the machine as a part of the frame. As the short wire 52 enters the upper part of the chute 191, it is lengthwise of said chute. It runs down to the dotted line position shown at the left in Fig. 10 and there assumes a horizontal position and drops down the rearwardly inclined lower end of said chute, as shown in Fig. 11, into a groove 200 located transversely of the machine in the outer face of the die 201, see Figs. 17 to 19. There are a number of such dies, there being a skeleton wheel 202 secured on the shaft 85, and one of said wheels for each intermediate strand wire, and the strand wires lie in the grooves 203 extending longitudinally of the machine or circumferentially in the projecting portions of the wheel 202. The tie wire drops into its die in the wheel before it reaches the strand wire so that the strand wire eventually lies upon the tie wire and helps to draw the tie wire down into the die so that the tie wire will be in staple form, as shown in Figs. 36 and 37.

The wheels 202 are constructed as shown in Figs. 17 and 18, with one side of the wheel solid and plate-like, as shown in the left-hand portion of Fig. 18, and the other side consisting of a plate, as shown in Fig. 17, with radial slots 204 extending from the periphery almost to the hub. At intervals and parallel with said slot 204 there is a cylindrical recess or cylinder 205 between the sides of the wheel, as shown in Fig. 18, and by dotted lines in Fig. 17, and within each of these cylinders the cylindrical die 201 operates or is reciprocated radially of the wheel. To that end pins 206 extend from the lower part of the die through the slot 204 and carry rollers 207 on their outer ends, thus making a series of dies and rollers, as shown in Fig. 17, and they are radially moved by a cam groove 208, see Fig. 13, on the lower end of each plate 193. Hence at each revolution of the shaft 85 and the wheels 202 each die is actuated outwardly to receive the cross wire 52, and as the die approaches the wheel 97, which carries the strand wire, it is moved out somewhat, as indicated in Fig. 12, so that it will carry the tie wire against the strand wire, and then until the die leaves the strand wire, nearly a half revolution of the wheel 202, the dies are held in their outward position to substantially the same extent, and at the time the strand wires leave the wheel 202 the dies are moved inwardly rather quickly, and then they are given a gradual outward movement until they again reach the chutes 191 for receiving the cross wires. While the tie wire is being conveyed by the die from the lower end of the chute 191 to the strand wire on the wheel 97, it is held from escape by a spring 210 which is secured to the lower end of the chute 191 and bears against the outer ends of the dies as they are moved. The two wheels 97 and 202 are geared so as to operate in such manner that the protruding die carried by the wheel will register with and enter one of the openings 211 in the rim of the wheel 97, such as appears in Figs. 12 and 16. The rim of the wheel 97 has two lateral radially extending side portions or flanges cut away at intervals at 211 as just stated and a plate 212 is secured by the screws 213 across said opening 211, said plate 212 extending circumferentially of the wheel and being midway between the sides thereof. The outer edge of said plate 212 has in it a longitudinal groove for holding the strand wire. When this plate comes in registry with the die 201, as shown in Fig. 12, the die carrying the tie wire 52 is forced by the cam groove 208 to some extent astride the plate 212, which bends the wire 52 into a staple. For this purpose the die 201 has a recess 214, as shown at the lower end of Fig. 18. In the staple forming movement the center of the staple engages the outer edge of the plate 212 in the wheel 97 and holds it in place against the strand wire, and the strand wire is held in place by the groove in the outer edge of the plate 212. The cam grooves 208 for operating the wheels 202 are carried by the arms 193 which are rigidly secured to and extend downwardly from the cross bar 194 of the frame. As the machine progresses farther and the die 201 has formed the tie wire into a staple, the strand wire carries that staple around the lower part of the wheel 202 with the points projecting outwardly, the plate 212 having in the meantime been withdrawn from between the two ends of the staple and the tension of the strand wire holds it in place. The wheel 99 is formed the same as the wheel 202 and is the same size and operates at the same speed and they are provided with the same sort of dies 201 formed, constructed and operated in the same way and adapted to register with each other as the two wheels revolve, and as the staple carried by the die and wheel 202 reaches the die carried by the wheel 99 the latter moves astride the outer ends of the staple, and as the wheel moves still farther, the extreme ends of the staple are brought in engagement with the inner curved surfaces of the groove 214, which bends the ends of the tie wire crosswise in behind the plate 212 and so as to leave the tie wire in the condition shown in Figs. 38 and 39. As this takes place the die in the wheel 202 recedes. The cam grooves 208 in the two wheels 99 and 202 are reversely arranged, as shown in Fig. 12, because in the case of the wheel 99 the strand wires and tie wires pass up over the wheel 99, whereas they pass under the wheel 202. In this regard the parts of the two wheels are merely reversed but otherwise they are similar. The cam grooves 208 for the wheels 99 are carried and held stationary by the arms 314 which extend downwardly, as seen in Fig. 12, and are secured to the frame. The wires 52 are carried around the upper part of the wheel 99 and reach the wheel 215 on the shaft 86 parallel with the shaft 79 and 85, the wheel 215 being the same diameter as and peripherally engaging the wheel 99. The wheel 215 is provided with fixed dies 217, see Fig. 14, each having in its outer end a longitudinally extending groove 218 and a transversely extending groove 219, see Fig. 15.

The twister mechanism for securing the cross wires 51 with the marginal strand wires is geared up so as to travel at the same speed as the wheel 215 and register therewith so that as the marginal wires are carried over the wheel 215 they will lie in the groove 218 in the die 217 and the cross wires will lie in the groove 219 in said die. When a die carrying a cross wire reaches a corresponding die 201 in the wheel 99, the cross wire 51 carried by the wheel 215 will be in place between the extreme ends of the tie wires 52, as shown in Fig. 40. There would be then a transverse row of tie wires 52 on the intermediate strand wires 50 with the cross wires lying in place, as shown, with all of the tie wires. When the two dies in the two wheels come together, the die 217 will bend down the two extreme ends of the tie wire 52 and flatten it, changing it from what is shown in Fig. 40 to what is shown in Figs. 41 and 42, where the extreme ends of the tie wire are bent down over the cross wire enough to tie and secure the cross wire to the intermediate strand wires. Then the fence fabric is completed, the marginal strand wires being then brought back into relative position with the intermediate strand wires and all united into one fabric which passes down between the wheels 99 and 215 to the reel.

I claim as my invention:

1. A wire fence machine including means for feeding the strand wires, wheels rotating in opposite directions with engaging peripheries between which the strand wires pass, and means carried by the engaging surfaces of said wheels for securing cross wires to said strand wires.

2. A wire fence machine including means for feeding the strand wires through the machine, means for moving the marginal strand wires through the machine in a different path from the intermediate strand wires, means for uniting cross wires to said marginal strand wires, and means for afterward uniting said cross wires to the intermediate strand wires.

3. A wire fence machine including means for feeding the strand wires through the machine, means for securing cross wires to the marginal strand wires, means for uniting tie wires to the intermediate strand wires while the cross wires are being secured to the marginal strand wires, and means for thereafter securing said cross wires to the intermediate strand wires by means of said tie wires.

4. A wire fence machine including means for feeding the strand wires through the machine, means for uniting tie wires to the strand wires, and means for thereafter securing cross wires to said strand wires by means of said tie wires.

5. A wire fence machine including means for feeding the strand wires through the machine, means for coiling the ends of the cross wires around the marginal strand wires, and means for coiling tie wires about the intermediate strand wires and then about the cross wires at their intersection.

6. A wire fence machine including means for feeding the strand wires through the machine, means for centrally coiling tie wires about the strand wires and leaving the ends of the tie wires projecting, and means for bending said free ends of said tie wires about cross wires for securing said cross wires to the strand wires.

7. A wire fence machine including means for feeding the strand wires through the machine, wheels for feeding a wire transversely of said strand wires, a sprocket chain for driving said feed wheels, a shaft, a sprocket wheel loosely mounted thereon, a trip pitched on said sprocket wheel, a spring for holding said trip in a normal position, a disk secured on said shaft adjacent to said sprocket wheel provided with means for engaging said trip when in normal position and thus driving said sprocket wheel, means for severing said wire for forming cross wires for the fence fabric, and means controlled by said severing means for moving said trip into position not to be engaged with said disk, whereby the wire feeding means will be temporarily stopped.

8. A wire fence machine including means for feeding strand wires through the machine, wheels for feeding a wire transversely across the strand wires, a sprocket wheel for driving said transverse wire feeding means, a shaft upon which said sprocket wheel is loosely mounted, a trip mounted on the side of said sprocket wheel, a spring for holding said trip in its normal position, a disk secured on said shaft adjacent to the sprocket wheel, rollers mounted on said disk in position to engage said trip when in a normal position and actuate the sprocket wheel, a ratchet wheel beside the sprocket wheel with an arm projecting therefrom through a slot in the sprocket wheel concentric with the fulcrum of said trip, and said arm engaging said trip for moving it into a position to disengage the rollers on said disk, means for severing said transverse feed wire to form cross wires for the fence fabric, and means controlled by said severing means for actuating said ratchet wheel while the severing means is operating.

9. A wire fence machine including a revoluble frame, a series of twisting wheels mounted in said frame and radially slotted so that a strand wire may extend through the entire annular series of said twisters and coaxially of the twisters, a twister lug on the face of each twister spaced from the position of the strand wire, means for placing a cross wire on the strand wires when in position, means for moving the cross wire into position between the strand wires and twister lugs and holding it there, and means for rotating said twisters as the frame carrying the twisters revolves whereby the ends of the cross wire may be twisted around the strand wire one or more times.

10. A wire fence machine including a revoluble frame, a series of twisting wheels mounted in said frame and radially slotted so that a strand wire may extend through the entire annular series of said twisters and coaxially of the twisters, a twister lug on the face of each twister spaced from the position of the strand wire, means for placing a cross wire on the strand wires when in position, means for moving the cross wire into position between the strand wires and twister lugs and holding it there, a bevel gear mounted in connection with said rotary frame for driving each twister, a spur gear connected with each bevel gear, and a stationary internal gear which meshes with all of said spur gears in the series.

11. A wire fence machine including a revoluble frame, a series of twisting wheels mounted in said frame and radially slotted so that a strand wire may extend through the entire annular series of the said twisters and coaxially of the twisters, a twister lug on the face of each twister spaced from the position of the strand wire, a spring arm secured to said frame and projecting radially behind each twister, means for actuating said twisters, and a stationary lug located near where the cross wire is placed across the strand wires and so as to clutch the outer end of said spring arm as the same revolves to engage temporarily in order that when it releases said spring arm the latter will throw the cross wire against the face of the twister between the strand wire and the twister lug on the face of the twister.

12. A wire fence machine including means for feeding strand wires through the machine, horizontally disposed wire cutting means rotating above the strand wires, means for feeding wires downwardly through said cutting mechanism with a step by step movement, means for actuating the cutting mechanism to form short tie wires, means for securing the tie wires to the strand wires, and a chute for receiving each tie wire as it is severed and guiding it as it descends by gravity and changing it from a vertical to a horizontal position transversely of the machine and strand wire.

13. A wire fence machine including a successive series of peripherally engaging wheels over which a strand wire successively passes, radially movable dies peripherally mounted in front of said wheels, cams for actuating and controlling the movements of said dies, and means for guiding tie wires successively to the dies of one of the said wheels so that they will lie transversely thereof.

In witness whereof, I have hereunto affixed my signature in the presence of the witnesses herein named.

GEORGE W. WHITTINGTON.

Witnesses:
E. H. MAYO,
H. J. WELLS.